United States Patent
Fujisawa et al.

(10) Patent No.: US 10,088,284 B2
(45) Date of Patent: Oct. 2, 2018

(54) THRUST VECTORING APPARATUS, THRUST VECTORING METHOD, AND FLYING BODY

(71) Applicant: MITSUBISHI HEAVY INDUSTRIES, LTD., Tokyo (JP)

(72) Inventors: Fuminori Fujisawa, Tokyo (JP); Hiroyuki Tani, Tokyo (JP); Daisuke Hyuga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 214 days.

(21) Appl. No.: 14/694,034

(22) Filed: Apr. 23, 2015

(65) Prior Publication Data
US 2016/0108851 A1    Apr. 21, 2016

(30) Foreign Application Priority Data

Oct. 17, 2014    (JP) .................................. 2014-213077

(51) Int. Cl.
*F42B 10/66*    (2006.01)
*F02K 9/90*    (2006.01)

(52) U.S. Cl.
CPC .............. *F42B 10/665* (2013.01); *F02K 9/90* (2013.01)

(58) Field of Classification Search
CPC . F02K 1/002; F02K 1/008; F02K 1/06; F02K 1/085; F02K 1/50
See application file for complete search history.

(56) References Cited

U.S. PATENT DOCUMENTS

| | | | | |
|---|---|---|---|---|
| 2,892,362 A | * | 6/1959 | Cameron Nicholas Donald ......... | B29C 47/0801 74/606 R |
| 4,272,040 A | * | 6/1981 | Bastian ..................... | F02K 9/90 239/265.19 |
| 4,274,610 A | * | 6/1981 | Bastian ................. | F42B 10/665 239/265.19 |

FOREIGN PATENT DOCUMENTS

| | | | |
|---|---|---|---|
| JP | 4-297800 | | 10/1992 |
| JP | 2012-202222 | | 10/2012 |
| KR | 20020079073 A | * | 10/2002 |

OTHER PUBLICATIONS

W. A. Stephen, L. L. Schoen, and R. G. Eatough, "Low Cost RPV Boosters", 1977, AIAA, AIAA/SAE 13th Propulsion Conference.*

* cited by examiner

*Primary Examiner* — Todd E Manahan
*Assistant Examiner* — Stefan Ibroni
(74) *Attorney, Agent, or Firm* — Wenderoth, Lind & Ponack, L.L.P.

(57) ABSTRACT

A first jet tab and a second jet tab are symmetrically arranged with respect to a symmetry plane and have a symmetrical shape with respect to the symmetry plane, and are symmetrically driven with respect to the symmetry plane by a driving section. A distance between a tip of the first jet tab and a first rotation axis is larger than a distance between the first rotation axis and the symmetry plane. A distance between a tip section of the second jet tab and a second rotation axis is larger than a distance between the second rotation axis and the symmetry plane.

11 Claims, 18 Drawing Sheets

THRUST VECTORING APPARATUS, THRUST VECTORING METHOD, AND FLYING BODY

CROSS-REFERENCE

This application is based on Japanese Patent application JP 2014-213077 and claims priority therefrom. The disclosure thereof is incorporated herein by reference.

TECHNICAL FIELD

The present invention relates to a thrust vectoring apparatus, a thrust vectoring method, and a flying object.

BACKGROUND ART

As a technique for vectoring the thrust of a flying object, the thrust vectoring apparatus of a jet tab type is known. The thrust vectoring apparatus of this type is loaded on the flying object (e.g. a missile). Hereinafter, the thrust vectoring apparatus of this type is merely called the "thrust vectoring apparatus".

The thrust vectoring apparatus operates roughly as follows. All of the plurality of tabs are in a position at which the tabs do not overlap with a nozzle exit. When the thrust direction of the flying object is vectored to a predetermined direction (e.g. a direction of increasing a pitch angle), one tab as an object of the plurality of tabs is driven to a position so as to overlap with the nozzle exit. Thus, the combustion gas which is exhausted from the nozzle hits the tab as the object so that the direction of the combustion gas flow changes. According to the change, the flying object orbit changes.

JP H04-297800A which relates to the thrust vectoring apparatus proposes a solution of the problem that a necessary rolling moment is not obtained. JP 2012-202222A proposes an improvement of the jet tab itself that should improve the flight control of the flying object.

SUMMARY OF THE INVENTION

When a thrust vectoring apparatus is loaded in a flying object, it is desirable that the thrust vectoring apparatus is smaller. Therefore, the inventors of the present invention aimed at the downsizing and lightening of the thrust vectoring apparatus.

The thrust vectoring apparatus in the first viewpoint of the present invention a nozzle which has a nozzle exit which exhausts a combustion gas, a first jet tab which rotates around a first rotation axis, a second jet tab which rotates around a second rotation axis, and at least one driving section to rotate the first jet tab around the first rotation axis and to rotate the second jet tab around the second rotation axis. When a first direction is defined as a direction orthogonal to a plane of the nozzle exit and directing from an inside of the nozzle to an outside of the nozzle, the first jet tab and the second jet tab are arranged in the first direction from the nozzle. The first jet tab includes: a first proximal section arranged so as not to overlaps with the nozzle exit in the first direction and connected with the first rotation axis; and a first tip section configured to be moveable from a first standby position where the first jet tab does not overlaps with the nozzle exit, to a first work position where the first tip section overlaps with the nozzle exit. The second jet tab includes: a second proximal section arranged so as not to overlaps with the nozzle exit in the first direction and connected with the second rotation axis; and a second tip section configured to be moveable from a first standby position where the first jet tab does not overlaps with the nozzle exit, to a first work position where the first tip section overlaps with the nozzle exit. The first jet tab and the second jet tab are symmetrically arranged with respect to a predetermined first symmetry plane, have a symmetrical shape with respect to the first symmetry plane, and are driven symmetrically with respect to the first symmetry plane by the driving section. A distance between a tip section of the first jet tab and the first rotation axis is larger than a distance between the first rotation axis and the first symmetry plane. A distance between a tip section of the second jet tab and the second rotation axis is larger than a distance between the second rotation axis and the first symmetry plane.

The thrust vectoring apparatus further includes: a drive control section configured to the driving section. The driving section includes: a first driving section configured to rotate the first jet tab around the first rotation axis; and a second driving section configured to rotate the second jet tab around the second rotation axis. The drive control section synchronously controls the first driving section and the second driving section to drive the first jet tab and the second jet tab symmetrically with respect to the first symmetry plane.

The thrust vectoring apparatus further includes: a power dividing mechanism configured to transfer a power of the driving section to the first jet tab and the second jet tab at a same time.

Desirably, the power dividing mechanism includes: a first shaft connected to the first jet tab at its one end section; a first gear disposed in the first shaft; a second shaft connected to the second jet tab at its one end section and to the driving section at its proximal section; and a second gear disposed in the second shaft. The first gear is arranged to engage with the second gear.

The first jet tab includes a first inner surface. The second jet tab includes a second inner surface. The first inner surface and the second inner surface are parallel to each other to face to each other when the first jet tab is in a first work position and the second jet tab is in the second work position.

The first jet tab has a shape in which the first tip section becomes thinner toward a tip, and the second jet tab has a shape in which the second tip section becomes thinner toward a tip.

Desirably, a thickness of the first tip section becomes thinner than that of the first proximal section, and a thickness of the second tip section becomes thinner than that of the second proximal section.

The thrust vectoring apparatus further includes a plurality of jet tab sets, each of which comprises the first jet tab and the second jet tab.

Desirably, the plurality of jet tab sets are arranged so that the plurality of jet tab sets do not interfere with each other even if the plurality of jet tab sets are driven at a same time.

Desirably, a flying object has the thrust vectoring apparatus.

A thrust vectoring method uses a thrust vectoring apparatus. The thrust vectoring apparatus includes: a nozzle having a nozzle exit to emit a combustion gas; a first jet tab configured to rotate around a first rotation axis; a second jet tab configured to rotate around a second rotation axis; and at least one driving section configured to drive the first jet tab and the second jet tab to rotate around the first rotation axis and the second rotation axis, respectively. When a first direction is defined as a direction orthogonal to a plane of the nozzle exit and directing from an inside of the nozzle to an outside of the nozzle, the first jet tab and the second jet tab are arranged in the first direction from the nozzle. The first jet tab includes: a first proximal section arranged so as not to overlaps with the nozzle exit in the first direction and connected with the first rotation axis; and a first tip section configured to be moveable from a first standby position where the first jet tab does not overlaps with the nozzle exit, to a first work position where the first tip section overlaps with the nozzle exit. The second jet tab includes: a second proximal section arranged so as not to overlaps with the nozzle exit in the first direction and connected with the second rotation axis; and a second tip section configured to be moveable from a first standby position where the first jet tab does not overlaps with the nozzle exit, to a first work position where the first tip section overlaps with the nozzle exit. The first jet tab and the second jet tab are symmetrically arranged with respect to a predetermined first symmetry plane, have a symmetrical shape with respect to the first symmetry plane, and are driven symmetrically with respect to the first symmetry plane by the driving section. A distance between a tip section of the first jet tab and the first rotation axis is larger than a distance between the first rotation axis and the first symmetry plane. A distance between a tip section of the second jet tab and the second rotation axis is larger than a distance between the second rotation axis and the first symmetry plane. The thrust vectoring method includes: driving, by the driving section, the first jet tab from the first standby position to the first work position, and the second jet tab from the second standby position to the second work position; and driving, by the driving section, the first jet tab from the first work position to the first standby position, and the second jet tab from the second work position to the second standby position, so that the distance between the tip sections increase monotonously.

According to the present invention, the downsized and lightened thrust vectoring apparatus can be provided. In addition, the flying object which includes the downsized and lightened thrust vectoring apparatus can be provided.

DESCRIPTION OF EMBODIMENTS

Figure 1:
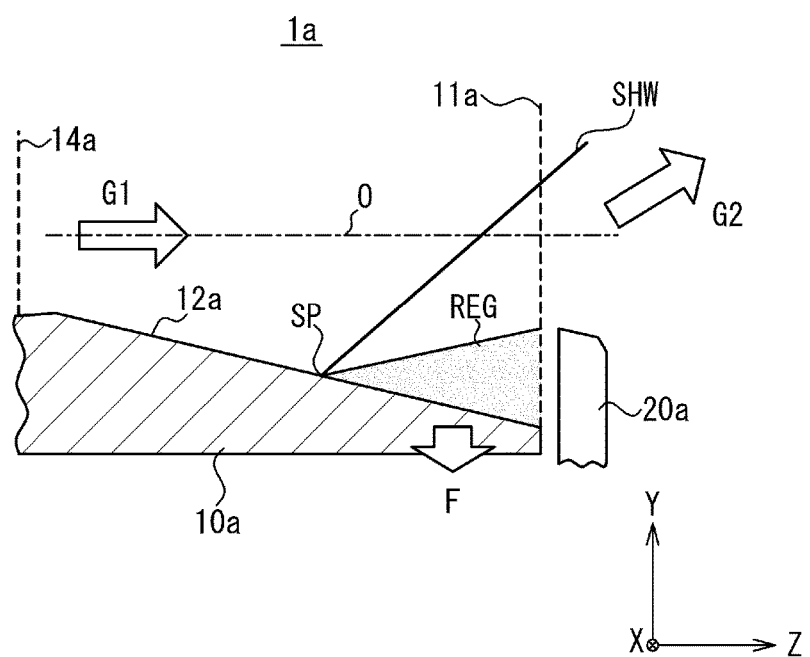
FIG. 1 is a diagram schematically showing a main portion of a thrust vectoring apparatus.

Hereinafter, embodiments of the present invention will be described with reference to the attached drawings. In the following embodiments, a same reference numeral is assigned to the same member. A serial numeral is used to distinguish the members with the same reference numeral.

(Principle of Thrust Vectoring Apparatus)

FIG. 1 is a side sectional view schematically showing a thrust vectoring apparatus 1a. The thrust vectoring apparatus 1a includes a nozzle 10a and a jet tab or tab 20a. The diameter of the inner space of the nozzle 10a becomes larger in a direction of combustion gas G1 flow from a throat 14a to a nozzle exit 11a. A jet tab 20a is arranged after the nozzle exit 11a in a direction of a combustion gas flow. In FIG. 1, a part of s jet tab 20a covers a part of the opening of the nozzle exit 11a.

The combustion gas G1 expands and flows in the direction from the throat 14a to the nozzle exit 11a, and is exhausted from the nozzle exit 11a. In this case, a high-pressure region REG is generated in the internal space of the nozzle 10a due to the jet tab 20a. In the high-pressure region REG, the inflow of the combustion gas G1 is restrained. A diagonal shock wave SHW is generated from a generation point SP of the high-pressure region REG. The combustion gas G1 is vectored or deflected with the diagonal shock wave SHW and exhausted from the nozzle exit 11a as a vectored flow G2. At this time, vectoring force F is generated by a Y-axial component (in a direction orthogonal to the central axis O of the nozzle 10a) of the vectored flow G2. The thrust of a flying object (having the nozzle 10a) is vectored with the vectoring force F.

(Shape of Jet Tab)

Figure 2A:
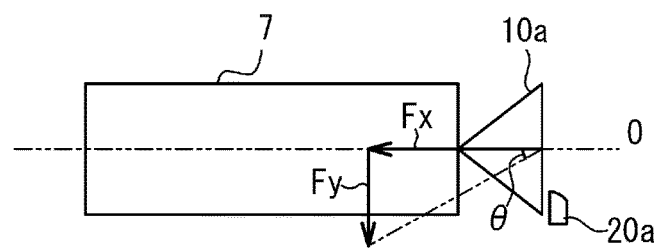
FIG. 2A is a diagram showing a thrust vectoring angle.
Figure 2B:
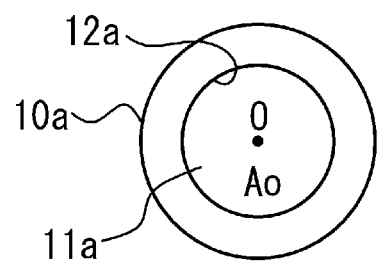
FIG. 2B is a diagram showing an area of the opening of a nozzle exit.
Figure 2C:
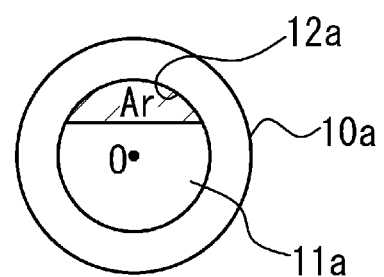
FIG. 2C is a diagram showing an overlap area Ar.

The shape of the jet tab is optional, and will be described with reference to FIG. 2A, FIG. 2B, FIG. 2C and FIG. 3. FIG. 2A is a diagram showing a thrust vectoring angle. FIG. 2A shows a side view of a rocket motor 7 and the nozzle 10a. The thrust force Fx and the vectoring force Fy act on the rocket motor 7. The thrust force Fx is a force to act on the direction of the central axis O. The vectoring force Fy is a force corresponding to the vectoring force F shown in FIG. 1. At this time, the thrust vectoring angle θ is defined as $\tan^{-1}(Fy/Fx)$ ($\theta \geq 0$). FIG. 2B shows an opening A0 of the nozzle exit 11a in a rear view from the rear side. The nozzle exit opening A0 represents an area the opening of the nozzle exit 11a surrounded by the nozzle inner wall surface 12a. FIG. 2C shows an overlap area Ar that is an area of an overlap part where the jet tab 20a covers the opening of the nozzle exit 11a. In actual, a plurality of jet tabs 20a are provided for the nozzle exit 11a, although a single jet tab 20a may be provided. Here, for simple description, a case of a single jet tab 20a will be described as an example.

Figure 3:
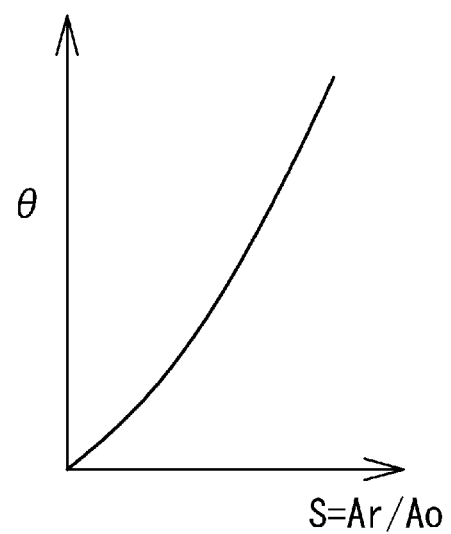
FIG. 3 is a diagram showing a relation of the magnitude of a vectoring force F and an area ratio S.

FIG. 3 is a diagram showing a relation of the thrust vectoring angle θ and an area ratio S as a ratio (S=Ar/A0) of the overlap area Ar to the nozzle exit opening area A0. At this time, the thrust vectoring angle θ is shown as a monotonously increasing function of the area ratio S=Ar/A0. In other words, as the overlap area Ar increases, the thrust vectoring angle θ increases. Also, the vectoring force Fy shown in FIG. 2A increases as the overlap area Ar substantially increases.

Figure 4:
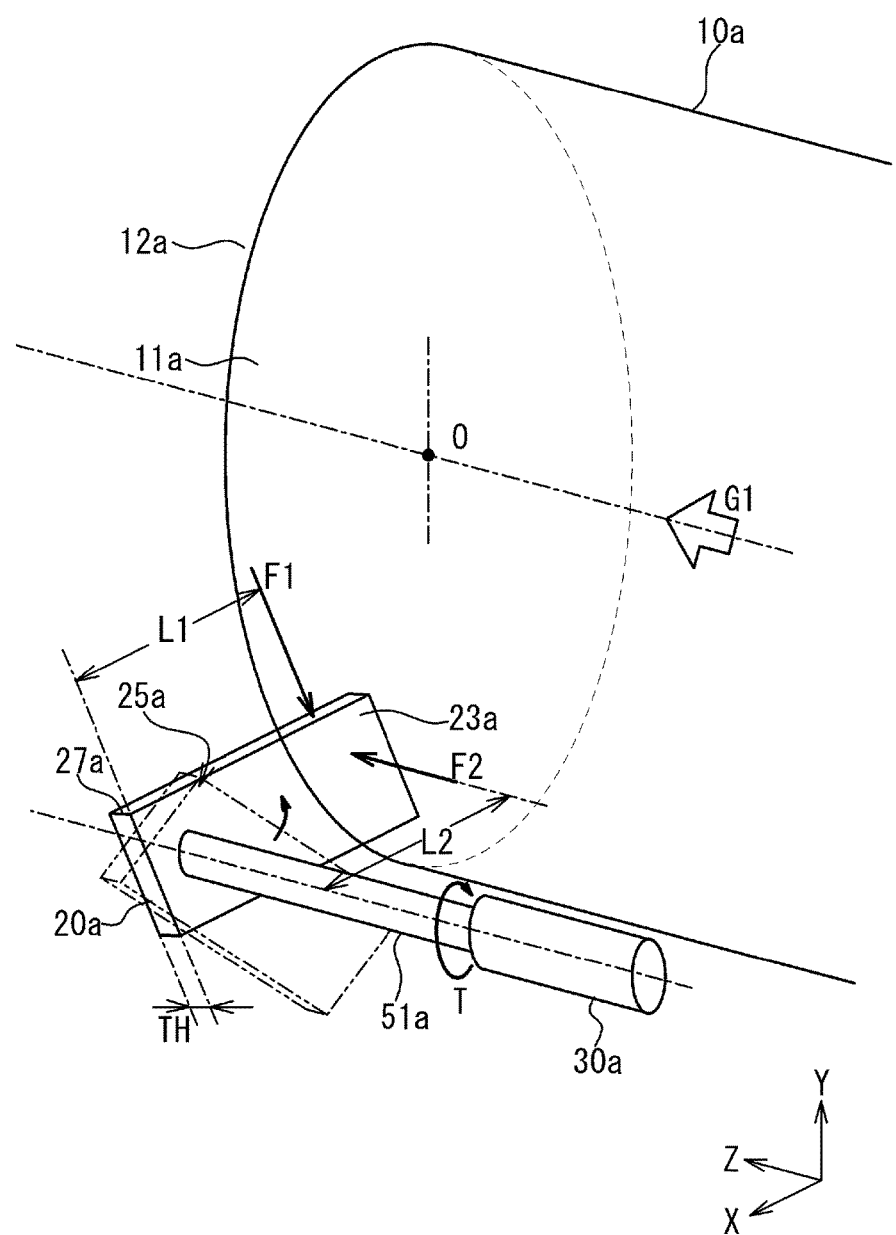
FIG. 4 is a diagram showing a force which a jet tab receives.

If the same vectoring force can be obtained, it is desirable that the size of the jet tab is as small as possible. This leads the downsizing and lightening of the thrust vectoring apparatus. FIG. 4 is a diagram showing a force which the jet tab $20a$ receives. In this case, the jet tab 20 has the shape of rectangular parallelepiped and is parallel to a plane orthogonal to the flow direction of the combustion gas G1 in the nozzle exit $11a$. The jet tab $20a$ receives hydrodynamic force from the combustion gas G1. In FIG. 4, a tip section $23a$ of the jet tab $20a$ overlaps with the opening of the nozzle exit $11a$ in the flow direction of the combustion gas G1 from the nozzle $10a$.

The combustion gas G1 is exhausted from the throat $14a$ of the nozzle $10a$ toward the nozzle exit $11a$. At this time, the jet tab 20 roughly receives two types of force from the combustion gas G1. A first type of force is a force F1 which a side surface $27a$ of the jet tab $20a$ receives. A second type of force is a force F2 which the surface $25a$ of the jet tab $20a$ receives. In the viewpoint of the hydrodynamics, these two types of forces are dominant.

As shown in FIG. 4, the first type of force F1 acts perpendicularly to the side surface $27a$ of the jet tab $20a$. First, the jet tab $20a$ is in a position where it does not overlap with the opening of the nozzle exit $11a$ (as shown by a two-dot chain line). Then, the jet tab $20a$ is rotated by a driving section $30a$ from the above position to a position where it overlaps with the opening of the nozzle exit $11a$. At this time, the driving section $30a$ receives the force F1 to hinder the rotation. By this force F1, a fluid load torque T is generated for the jet tab $20a$. The direction of the fluid load torque T is opposite to the rotation direction of the jet tab $20a$. The magnitude of fluid load torque T is shown by the force F1×a span L1. The span L1 is a distance to a position where the jet tab 20 receives the force F1, from a position where the jet tab $20a$ and a shaft $51a$ are coupled. Note that the force F1 is a force which acts on some representative point. In actual, the force which the jet tab $20a$ receives is a summation of forces which act on respective points. Specifically, the fluid load torque T which the jet tab $20a$ receives is a summation of the fluid load torques (F1×L1) which acts on respective points.

As shown in FIG. 4, the second type of force F2 acts perpendicularly to the surface $25a$ of the jet tab $20a$. The tip section $23a$ of the jet tab $20a$ is pressed to the flow direction of the combustion gas G1 with the force F2. By this force F2, the jet tab $20a$ receives a bending moment M. The magnitude of the bending moment M is shown by the force F2×the span L2. The span L2 is the distance to a position where the jet tab $20a$ receives the force F2, from the shaft 51. Note that the force F2 is a force which acts on some representative point. In actual, the force which the jet tab $20a$ receives is a summation of forces which act on respective points. Specifically, the bending moment M which the jet tab $20a$ receives is a summation of the bending moments (F2×L2) which act on the respective point.

If the thickness TH of the jet tab $20a$ becomes thinner, the force F1 which acts perpendicularly to the side surface $27a$ of the jet tab $20a$ becomes smaller, although the strength of the jet tab $20a$ becomes weaker. On the other hand, if a part of the jet tab $20a$ which overlaps with the opening of the nozzle exit $11a$ becomes smaller, the force F2 which acts perpendicularly to the surface $25a$ of the jet tab $20a$ becomes smaller. In this case, however, it becomes difficult to acquire a desired vectoring force F. Therefore, it is required to reduce the forces F1 and F2 acting on the jet tab $20a$ as much as possible while securing the desired vectoring force F.

First Embodiment (Overview)

Figure 5:
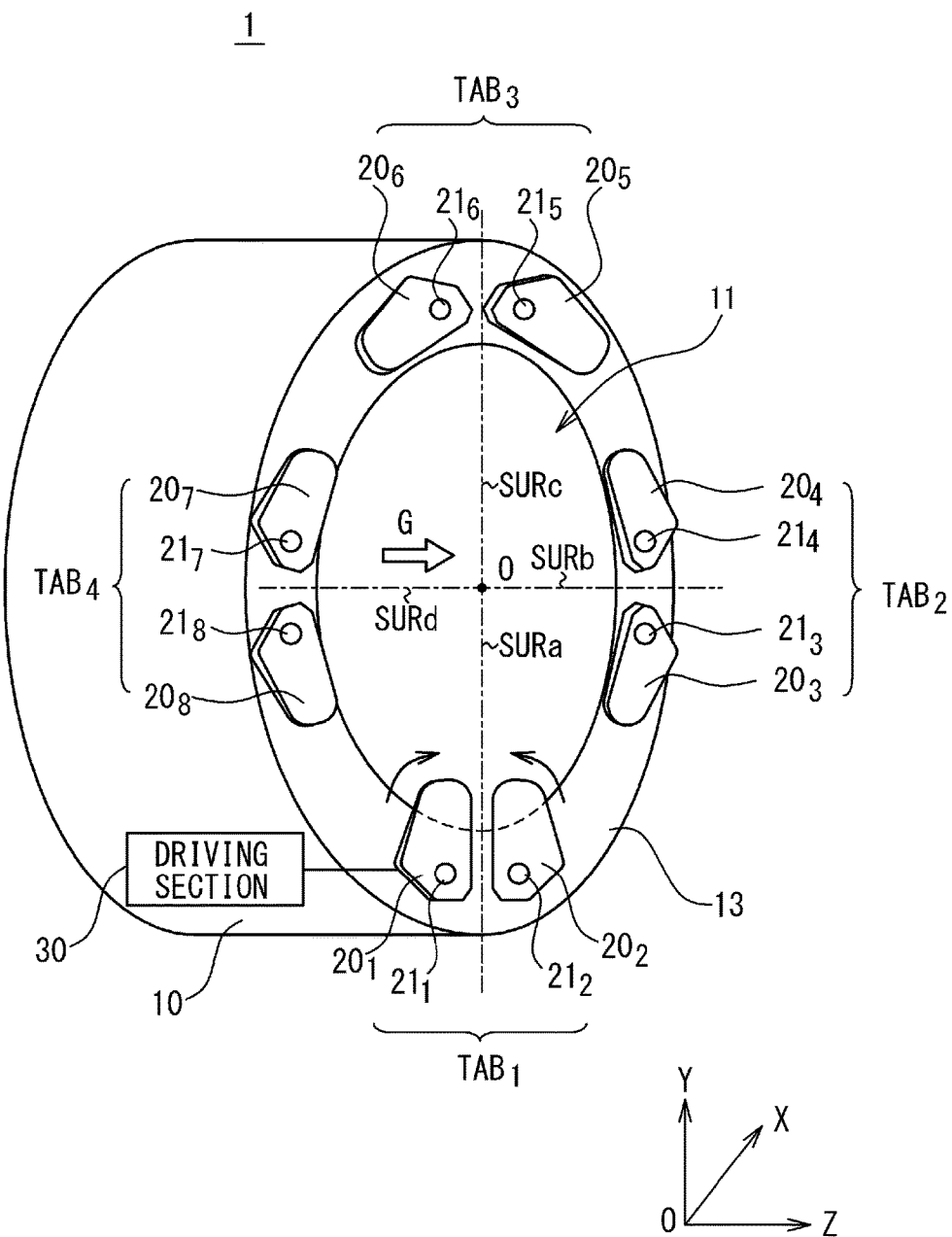
FIG. 5 is a perspective view of the thrust vectoring apparatus according to a first embodiment.

The overview of a first embodiment will be described, with reference to FIG. 5 and FIG. 6. FIG. 5 is a perspective view of the thrust vectoring apparatus 1 according to the first embodiment. As shown in FIG. 5, the thrust vectoring apparatus 1 includes the nozzle 10, first to eighth jet tabs $20_1$ to $20_8$, and a driving section. The first to eighth jet tabs $20_1$ to $20_8$ have first to eighth rotation axes $21_1$ to $21_8$, respectively. The nozzle 10 includes the nozzle exit 11 and a nozzle bottom end 13. The driving section 30 rotates the first jet tab $20_1$ around the first rotation axis $21_1$ and rotates the second jet tab $20_2$ around the second rotation axis $21_2$.

In the present embodiment, in order to obtain the desired vectoring force F while reducing the force applied to the jet tab 20, one tab set TAB is configured from two jet tabs 20. A first tab set $TAB_1$ includes the first jet tab $20_1$ and the second jet tab $20_2$. In the same way, a second tab set $TAB_2$ includes the third jet tab $20_3$ and the fourth jet tab $20_4$. A third tab set $TAB_3$ includes the fifth jet tab $20_5$ and the sixth jet tab $20_6$. A fourth tab set $TAB_4$ includes the seventh jet tab $20_7$ and the eighth jet tab $20_8$.

There are first to fourth symmetry planes SURa to SURd between the two jet tabs 20 of the respective tab sets TAB. In the first tab set $TAB_1$, there is the first symmetry plane SURa between the first jet tab $20_1$ and the second jet tab $20_2$. The first jet tab $20_1$ and the second jet tab $20_2$ are symmetrically arranged with respect to the first symmetry plane SURa and have a symmetrical shape with respect to the first symmetry plane SURa. Each of the jet tab sets has the same structure. In the following description, the first tab set $TAB_1$ will be described if there is not any especial matter.

Figure 6:
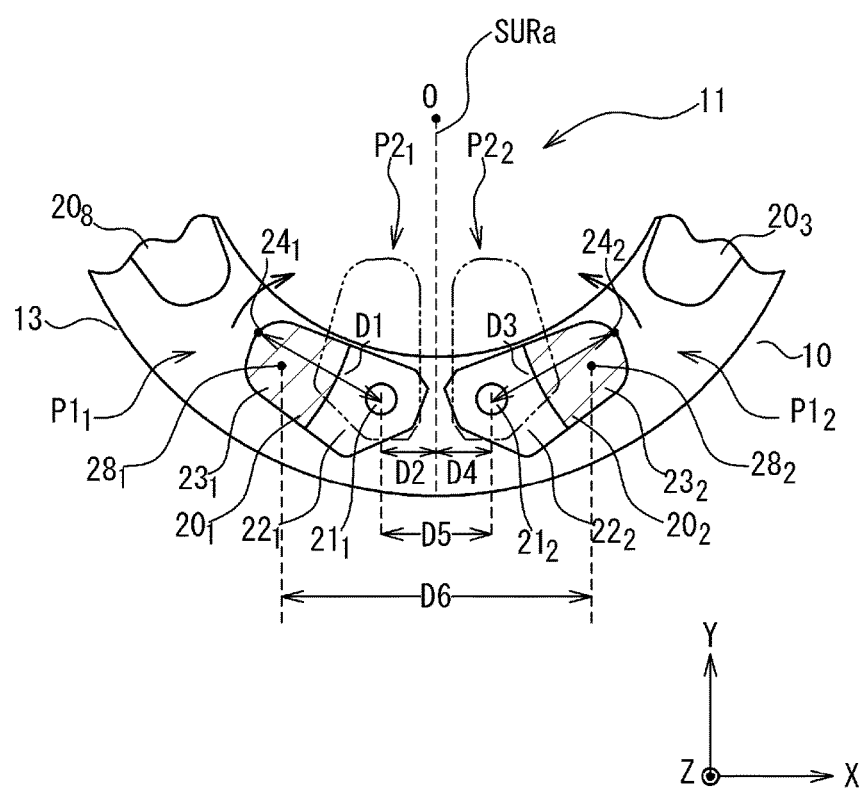
FIG. 6 is a partial expanded view around a first tab set.

FIG. 6 is a partial expanded view around the first tab set $TAB_1$. As shown in FIG. 6, the first jet tab $20_1$ further includes a first proximal end $22_1$ connected with first rotation axis $21_1$ and a first tip section $23_1$. The second jet tab $20_2$ further includes a second proximal end $22_2$ connected with the second rotation axis $21_2$ and a second tip section $23_2$. Each of the first jet tab $20_1$ and the second jet tab $20_2$ is arranged so as not to overlap with the opening of the nozzle exit 11 in the flow direction of the combustion gas. The driving section 30 rotates the first jet tab $20_1$ and the second jet tab $20_2$ around the first rotation axis $21_1$ and the second rotation axis $21_2$, respectively. The first rotation axis $21_1$ and the second rotation axis $21_2$ are apart from each other. The positions are both fixed.

Here, a distance between the first rotation axis $21_1$ and a first tip $24_1$ (a tip point on the first jet tab $20_1$ which is most apart from the first rotation axis $21_1$) is a distance D1. The distance to the first symmetry plane SURa from the first rotation axis $21_1$ is D2. The distance between the second rotation axis $21_2$ and the second tip $24_2$ (a tip point on the second jet tab $20_2$ which is most apart from the second rotation axis $21_2$) is D3. The distance to the first symmetry plane SURa from the second rotation axis $21_2$ is D4.

The first jet tab $20_1$ is driven in a range from a first standby position $P1_1$ to a first work position $P2_1$ by the driving section 30. The second jet tab $20_2$ is driven in a range from the second standby position $P1_2$ to the second work position $P2_2$ by the driving section 30.

When the first jet tab $20_1$ is in the first standby position $P1_1$ and the second jet tab $20_2$ is in the second standby position $P1_2$, the first tip section $23_1$ and the second tip section $23_2$ do not face each other.

When the first jet tab $20_1$ is driven to the first work position $P2_1$ from the first standby position $P1_1$ and the second jet tab $20_2$ is driven to the second work position $P2_2$ from the second standby position $P1_2$, the first jet tab $20_1$ and the second jet tab $20_2$ are symmetrically rotated in such a direction that they approach the first symmetry plane SURa monotonously and they are symmetrical with respect to the first symmetry plane SURa. Specifically, the first jet tab $20_1$ is rotated to the first work position $P2_1$ (shown by a two-dot chain line) from the first standby position $P1_1$ (shown by a solid line). Simultaneously, the second jet tab $20_2$ is rotated to the second work position $P2_2$ (shown by a two-dot chain line) from the second standby position $P1_2$ (shown by a solid line).

To realize this relation, the following relation should be satisfied. The distance between the first rotation axis $21_1$ and the second rotation axis $21_2$ is shown by D5=D2+D4. The distance D5 is a constant value called a distance between the rotation axes. The distance between a surface center $28_1$ of the first tip section $23_1$ and a surface center $28_2$ of the second tip section $23_2$ is shown by D6. The distance D6 is called a distance between the tip sections. Here, the surface center shows a diagram center of a corresponding tip section 23. When the first jet tab $20_1$ is in the first standby position $P1_1$ and the second jet tab $20_2$ is in the second standby position $P1_2$, the distance D6 between the tip sections is larger than the distance D5 between the rotation axes.

The above-mentioned relation can be expressed as follows. Between the distance D1 and the distance D2, the following relation should be satisfied. The distance D1 between the first tip section $24_1$ and the first rotation axis $21_1$ is larger than the distance D2 between the first rotation axis $21_1$ and the first symmetry plane SURa of the first jet tab $20_1$. Moreover, the distance D3 and the distance D4 should satisfy the following relation. In the second jet tab $20_2$, the distance D3 between the second tip section $24_2$ and the second rotation axis $21_2$ is larger than the distance D4 between the second rotation axis $21_2$ and the first symmetry plane SURa.

(Operation (Thrust Vectoring Method))

At the time of the thrust vectoring, the driving section 30 drives the first jet tab $20_1$ from the first standby position $P1_1$ to the first work position $P2_1$ and drives the second jet tab $20_2$ from the second standby position $P1_2$ to the second work position $P2_2$, so that the distance D6 between the tip sections decreases monotonously. Contrary to this, in case of cancellation of the thrust vectoring, the driving section 30 drives the first jet tab $20_1$ from the first work position $P2_1$ to the first standby position $P1_1$, and drives the second jet tab $20_2$ from the second work position $P2_2$ to the second standby position $P1_2$, so that the distance D6 between the tip sections increases monotonously.

The above-mentioned relation exists on each of the jet tab sets TABs. Thus, the following effects are obtained. First, the reduction of fluid load torque T and the bending moment M is obtained. In the present embodiment, one tab set TAB is configured from the two jet tabs 20. Here, it is supposed that the jet tabs of only one optional jet tab set TAB are in the work positions. If the overlap area Ar should be attained by one jet tab, the surface area of the tip section of one jet tab (area of the tip section 23a in FIG. 4) becomes larger than one in the present embodiment. This means that the force F2 acting to the one jet tab (referring to FIG. 4) increases and hinders the downsizing and lightening of the thrust vectoring apparatus. Therefore, in the present embodiment, to reduce the force F2 acting on the one jet tab 20, one tab set TAB is configured from the two jet tabs 20. As a result, the bending moment M is reduced and the fluid load torque T is also reduced.

Figure 7:
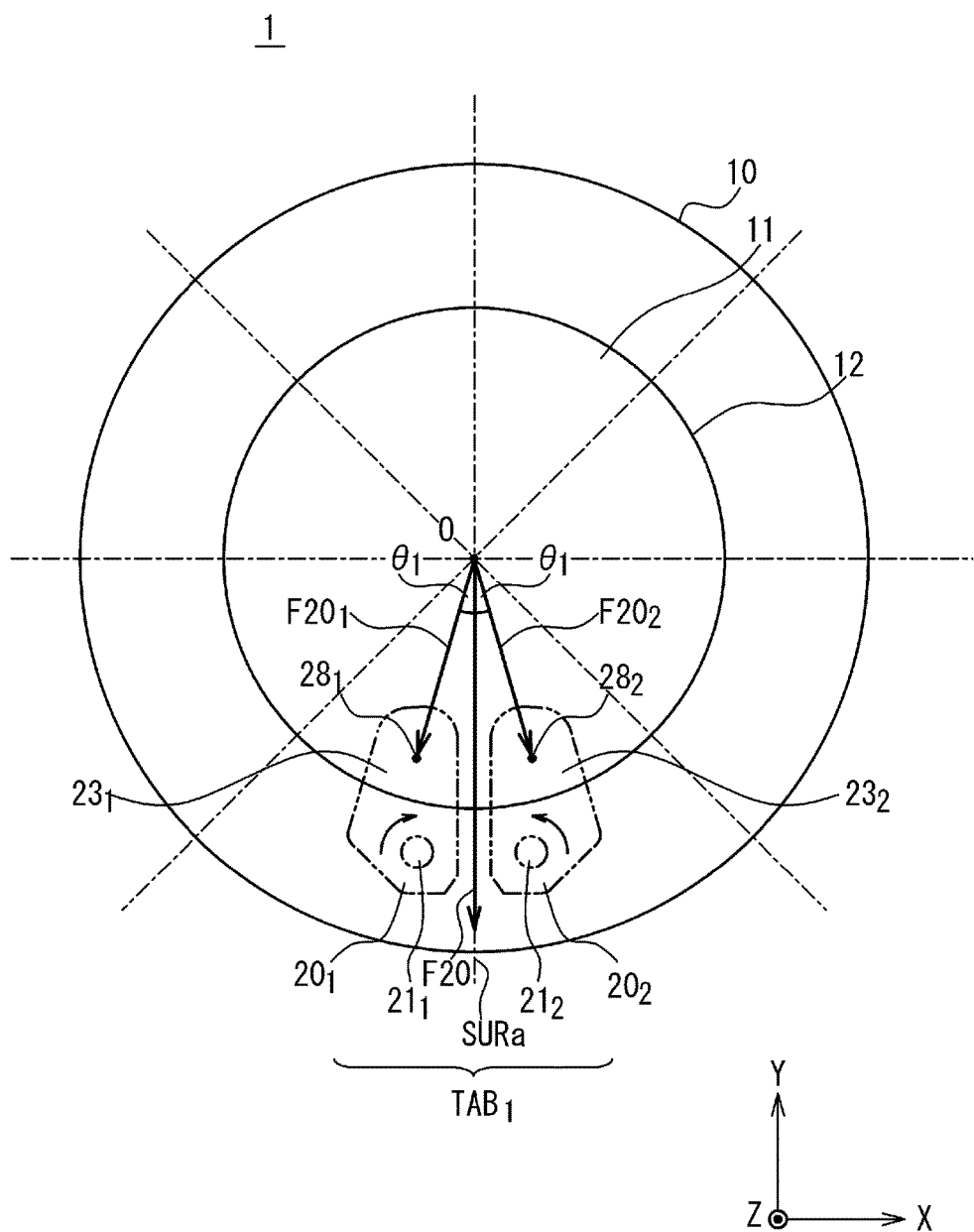
FIG. 7 is a diagram showing the vectoring force obtained by the thrust vectoring apparatus according to the first embodiment.
Figure 8:
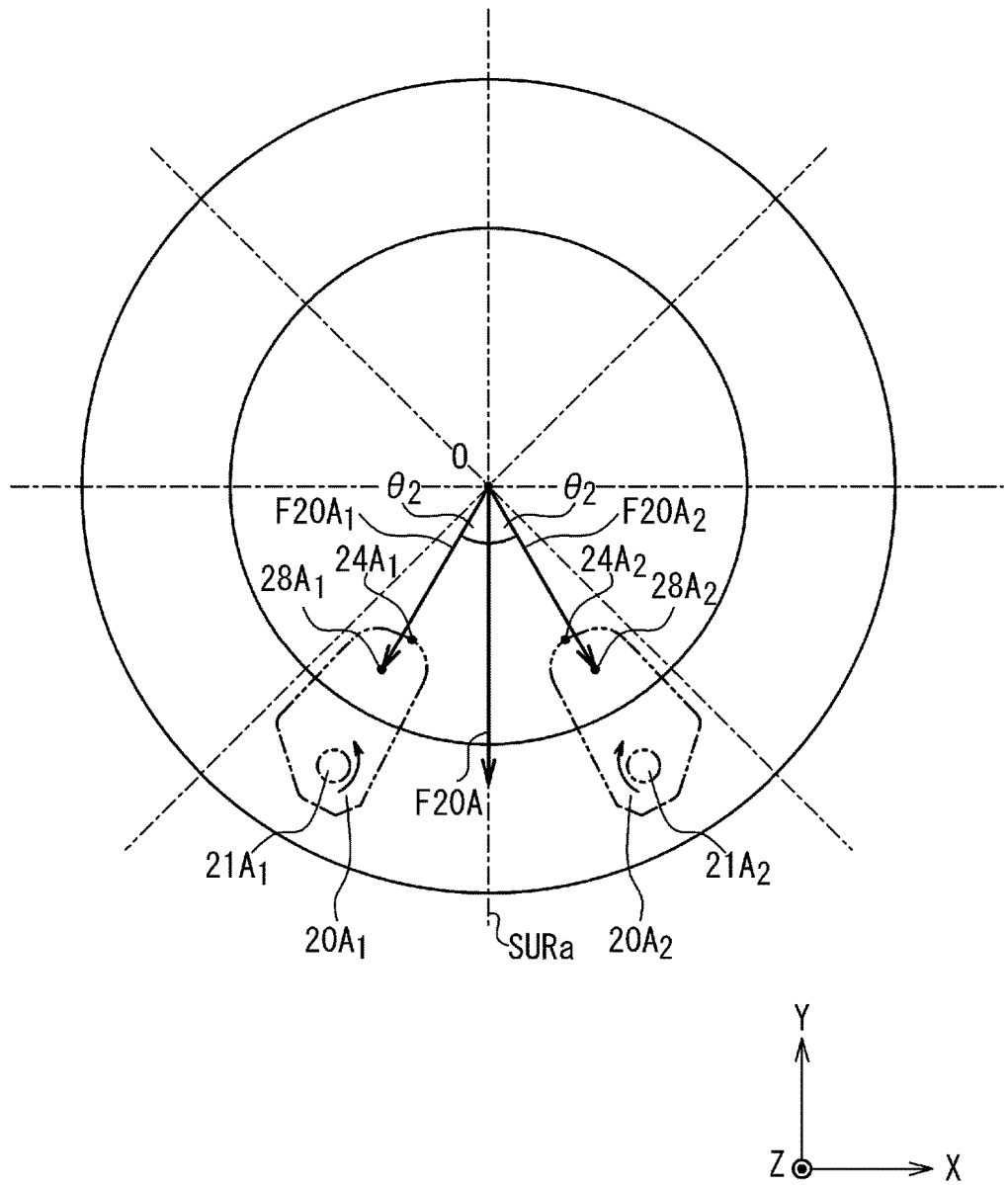
FIG. 8 is a diagram showing the vectoring force obtained by the thrust vectoring apparatus in another example.

Second, the vectoring force increases. This will be described in relation to FIG. 7 and FIG. 8. In FIG. 7, the vectoring force obtained in the first embodiment is considered. In FIG. 8, a comparison example is considered.

FIG. 7 is a diagram showing the vectoring force obtained by the thrust vectoring apparatus 1 according to the first embodiment. Note that for simple description, FIG. 7 shows only the first tab set $TAB_1$ which is in the work position. The other tab sets $TAB_2$ to $TAB_4$ are in the standby positions.

The first vectoring force $F20_1$ is generated by the first jet tab $20_1$. The first vectoring force $F20_1$ acts in a direction from the central axis O of the nozzle 10 to the plane center $28_1$ of the first tip section $23_1$ on the surface containing the nozzle exit 11. The first vectoring force $F20_1$ is a vector force having an X axial component and a Y axial component. An angle between the first vectoring force $F20_1$ and the Y axis is $\theta_1$. Note that the Y axis is parallel to the first symmetry plane SURa.

The second vectoring force $F20_2$ is generated by the second jet tab $20_2$. The second vectoring force $F20_2$ generated by the second jet tab $20_2$ acts in a direction from the central axis O of the nozzle 10 to the plane center $28_2$ of the second tip section $23_2$ on the plane orthogonal to the above direction in the nozzle exit 11. An angle between the second vectoring force $F20_2$ and the Y axis is $\theta_1$ which is the same as in case of the first vectoring force $F20_1$. This is based on the shapes of the first jet tab $20_1$ and the second jet tab $20_2$ and the symmetrical arrangement.

The vectoring force F20 generated by the first tab set $TAB_1$ is a resultant force of the first vectoring force $F20_1$ and the second vectoring force $F20_2$. Therefore, as shown in FIG. 7, the vectoring force F20 is generated in a direction approaching the nozzle inner wall surface 12 from the central axis O of the nozzle 10 (a negative direction of the Y axis).

FIG. 8 is a diagram showing the vectoring force obtained by another example of the thrust vectoring apparatus 1A. The thrust vectoring apparatus 1A shown in FIG. 8 includes a first jet tab $20A_1$ which rotates around a first rotation axis $21A_1$ and a second jet tab $20A_2$ which rotates around the second rotation axis $21A_2$. FIG. 8 shows a case where both of the first jet tab $20A_1$ and the second jet tab $20A_2$ are in work positions. Basically, the thrust vectoring apparatus 1A shown in FIG. 8 has the same structure as that shown in FIG. 7. Therefore, between the thrust vectoring apparatus 1 shown in FIG. 7 and the thrust vectoring apparatus 1A shown in FIG. 8, there is no difference in the overlap area Ar. However, there is a large difference in the following points.

The first difference is in the distance between the two rotation axes. The distance between the first rotation axis $21A_1$ and the second rotation axis $21A_2$ shown in FIG. 8 is larger than the distance between the first rotation axis $21_1$ and the second rotation axis $21_2$ shown in FIG. 7. The second difference is in that the rotation direction of the first jet tab $20A_1$ and the rotation direction of the second jet tab $20A_2$ shown in FIG. 8 are opposite to those shows in FIG. 7 when two jet tabs move from the standby positions to the work positions.

In other words, the arrangement shown in FIG. 8 is adopted so that the first tip section $23A_1$ and the second tip section $23A_2$ face each other, when both of the first jet tab $20A_1$ and the second jet tab $20A_2$ are in the standby positions. This is different from the thrust vectoring apparatus 1 of the present embodiment.

The magnitude of the vectoring force F changes because of the two differences. In FIG. 8, the angle between the first vectoring force $F20A_1$ and the Y axis is $\theta_2$. This angle $\theta_2$ is larger than the angle $\theta_1$ shown in FIG. 7 ($\theta_2 > \theta_1$). This is the same for the second vectoring force $F2A_2$. Therefore, the vectoring force F20A (=$F20A_1$+$F20A_2$) is smaller than the vectoring force F20 shown in FIG. 7 (F20A<F20).

As mentioned above, there is no difference in the overlap area Ar between the thrust vectoring apparatus 1 shown in FIG. 7 and the thrust vectoring apparatus 1A shown in FIG. 8. Nevertheless, the vectoring force F20 shown in FIG. 7 is larger than the vectoring force F20A shows in FIG. 8. In other words, the smaller jet tab in the example (the present embodiment) of FIG. 7 is enough to acquire an identical vectoring force, compared with the example of FIG. 8. This leads the downsizing and lightening of the thrust vectoring apparatus in addition to the downsizing of the driving section.

The third difference is in the point that the deviation of the vectoring force (a misalignment) is very small. The deviation of the vectoring force means a difference between the corresponding symmetry plane SUR and the vectoring force. The first jet tab $20_1$ and the second jet tab $20_2$ have a symmetrical shape with respect to the symmetry plane SURa. Moreover, the first jet tab $20_1$ and the second jet tab $20_2$ are driven to be symmetrical with respect to the first symmetry plane SURa. Therefore, the two vectoring forces $F20_1$ and $F20_2$ which are symmetrical with respect to the first symmetry plane SURa are obtained as shown in FIG. 7. As a result, the difference between the vectoring force F20 as the resultant force of both and the first symmetry plane SURa is zero or very small. This symmetry contributes to the small deviation of the vectoring force.

(Standby Position and Work Position)

The details of the standby position and the work position are as follows. When the first jet tab $20_1$ is in the first standby position $P1_1$, the first jet tab $20_1$ is outside the opening of the nozzle exit 11 so as not to overlap with the opening of the nozzle exit 11. For example, the first standby position $P1_1$ is a position where the whole of the first jet tab $20_1$ overlaps with the nozzle bottom end 13.

On the other hand, when the first jet tab $20_1$ is in the first work position $P2_1$, the first jet tab $20_1$ is in a position where a part of the first jet tab $20_1$ (the first tip section $23_1$) overlaps with the opening of the nozzle exit 11. Specifically, the first work position $P2_1$ is a position where the thrust vectoring force by the first jet tab $20_1$ and the second jet tab $20_2$ becomes maximum.

When the second jet tab $20_2$ is in the second standby position $P1_2$, the second jet tab $20_2$ is outside the opening of the nozzle exit 11 so as not to overlap with the opening of the nozzle exit 11. Specifically, the second standby position $P1_2$ is the position where the whole of the second jet tab $20_2$ overlaps with the nozzle bottom end 13.

On the other hand, when the second jet tab $20_2$ is in the second work position $P2_2$, the part of the second jet tab $20_2$ (the second tip section $23_2$) overlaps with the opening of the nozzle exit 11. Specifically, the second work position $P2_2$ is a position where the thrust vectoring force by the first jet tab $20_1$ and the second jet tab $20_2$ becomes maximum.

Note that attention should be paid to the following. It is assumed that the required vectoring force is smaller than the maximum vectoring force in case of design. In this case, the first work position $P2_1$ is a position where the thrust vectoring force by the first jet tab $20_1$ and the second jet tab $20_2$ is equal to the required vectoring force. In the same way, the second work position $P2_2$ is a position where the thrust vectoring force by the first jet tab $20_1$ and the second jet tab $20_2$ is equal to the required vectoring force.

(Jet Tab)

The first tip section $23_1$ is a part of the first jet tab $20_1$. In detail, the first tip section $23_1$ is a part of the first jet tab $20_1$ that overlaps with the opening of the nozzle exit 11 when the first jet tab $20_1$ is in the first work position $P2_1$. The first proximal section $22_1$ is a part of the first jet tab $20_1$ except for the first tip section $23_1$. The second tip section $23_2$ is a part of the second jet tab $20_2$. In detail, the second tip section $23_2$ is a part of the second jet tab $20_2$ that overlaps with the opening of the nozzle exit 11 when the second jet tab $20_2$ is in the second work position $P2_2$. The second proximal section $22_2$ is a part of the second jet tab $20_2$ except for the second tip section $23_2$.

(Side Section of Thrust Vectoring Apparatus)

Figure 9:
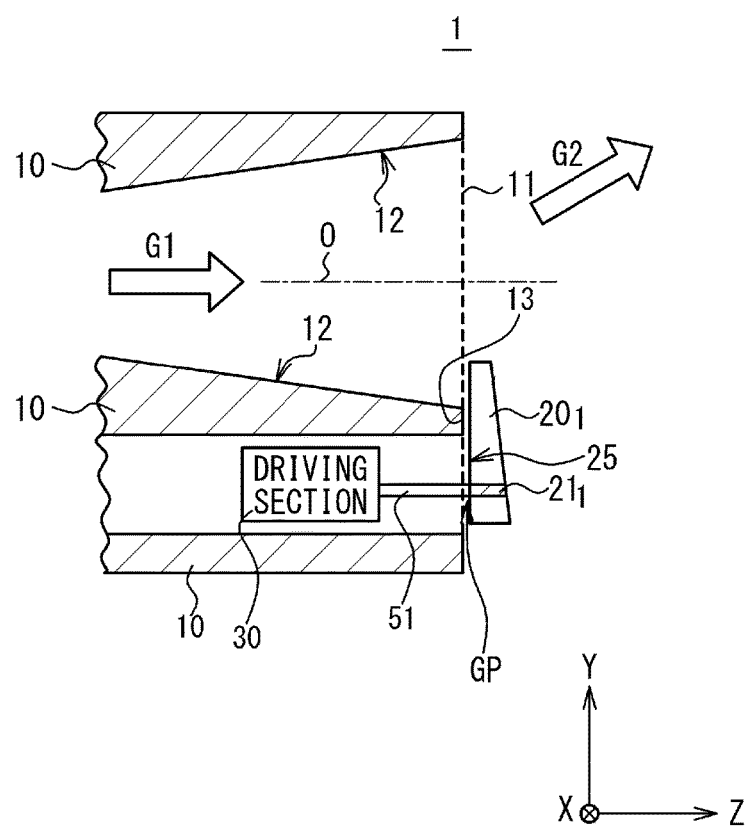
FIG. 9 is a side sectional view of the thrust vectoring apparatus around the first jet tab.

FIG. 9 is a side sectional view showing the periphery of the first jet tab $20_1$ of the thrust vectoring apparatus. FIG. 9 shows a condition that the first jet tab $20_1$ is in the first work position $P2_1$.

The first jet tab $20_1$ is arranged behind the nozzle bottom end 13 in the flow direction of the combustion gas. The nozzle bottom end 13 is a part corresponding to the bottom of the nozzle 10. To simplify the description, the nozzle bottom end 13 is supposed to be flat in the rear view. The first rotation axis $21_1$ is connected to the driving section 30 through a shaft 51. Note that the shaft 51 may be the first rotation axis $21_1$. For example, the driving section 30 is arranged in the nozzle 10 which is different from a space through which the combustion gas G1 flows.

There is a small gap (a margin) GP between the surface 25 of the first jet tab $20_1$ and the nozzle bottom end 13. The width of the gap GP is sufficient if the combustion gas G1 which flows into the gap GP is as little as possible, and the first jet tab $20_1$ can rotate smoothly without any contact with the nozzle bottom end 13. Note that as the gap GP becomes large, an amount of the combustion gas G1 which flows into the gap GP increases more. As a result, the pressure of the high-pressure region REG (referring to FIG. 1) decreases so that the vectoring force F becomes small.

(Arrangement of Jet Tab)

The jet tabs 20 of each of the jet tab sets $TAB_1$ to $TAB_4$ are arranged so that the first to fourth tab sets $TAB_1$ to $TAB_4$ do not interferes with each other, even when all of the first to fourth tab sets $TAB_1$ to $TAB_4$ are driven at a same time.

Figure 10:
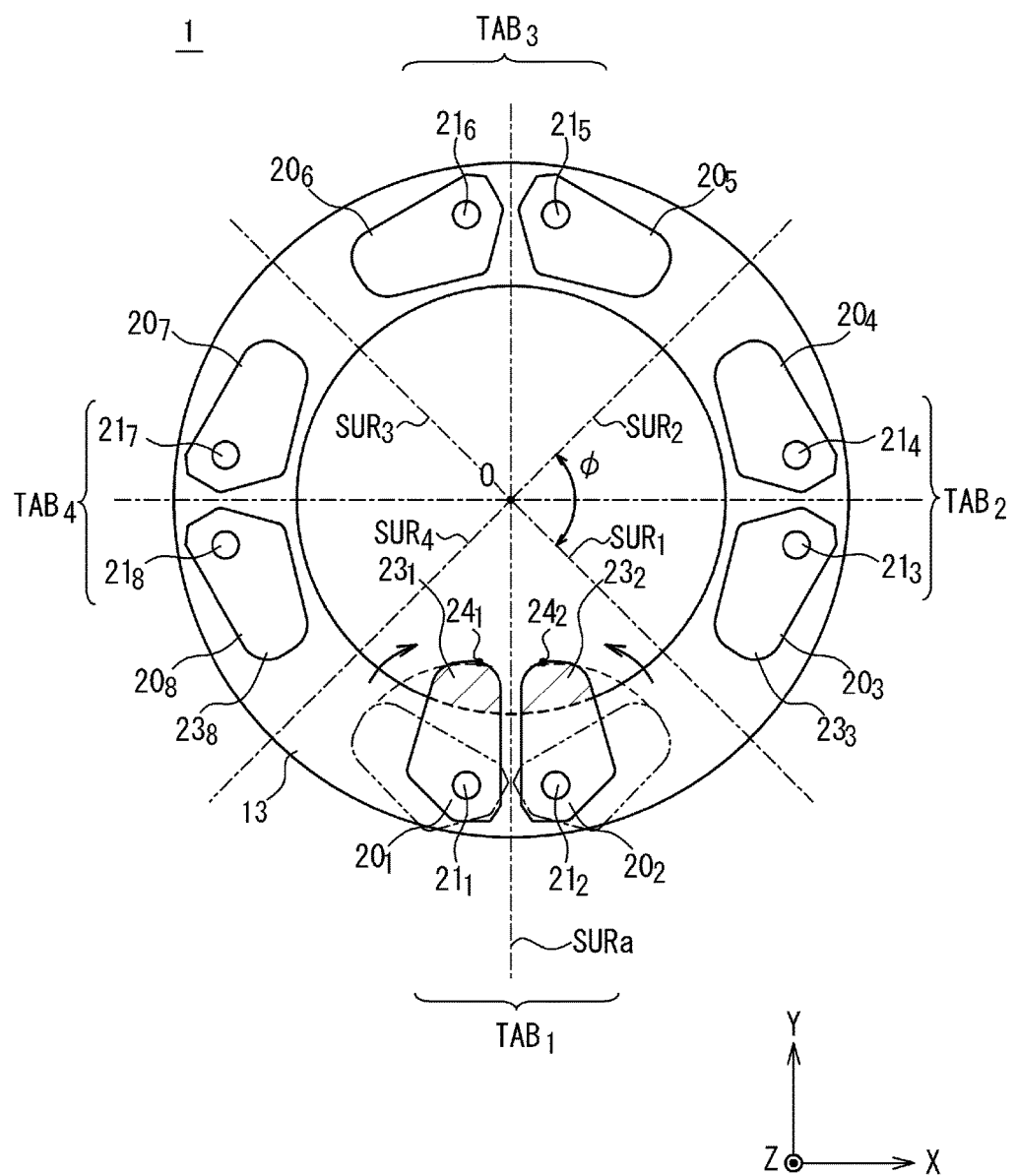
FIG. 10 is a diagram showing the thrust vectoring apparatus 1 in a rear view.

FIG. 10 is a diagram showing the thrust vectoring apparatus 1 in the rear view from. As shown in FIG. 10, the shape of the nozzle bottom end 13 is circular in the view. The first to eighth jet tabs $20_1$ to $20_8$, i.e. the first to fourth tab sets $TAB_1$ to $TAB_4$ are arranged at an equal interval along the circumferential shape of the nozzle bottom end 13. Paying attention to the first tab set $TAB_1$ in the standby position, the first tip section $23_1$ of the first jet tab $20_1$ faces the eighth tip section $23_8$ of the eighth jet tab $20_8$. The second tip section $23_2$ of the second jet tab $20_2$ faces the third tip section 233 of the third jet tab $20_3$.

Note that the shape of the nozzle bottom end 13 is an example. Even if the nozzle bottom end 13 has another shape (for example, a shape except for a circle), there is no problem.

The first to fourth tab sets $TAB_1$ to $TAB_4$ are arranged at the interval of $\phi=90°$ in the circumferential direction. By adopting this angular interval ($\phi$), the first to eighth jet tabs $20_1$ to $20_8$ without any contacts between the two neighboring jet tabs 20 can be arranged in the circumferential direction without any contact. Moreover, when the first to fourth tab sets $TAB_1$ to $TAB_4$ are driven from the standby position to the work position (or oppositely), the two neighboring jet tabs 20 in the circumferential direction of the first to eighth jet tabs $20_1$ to $20_8$ never contacts.

(Shape of Jet Tab)

Figure 11:
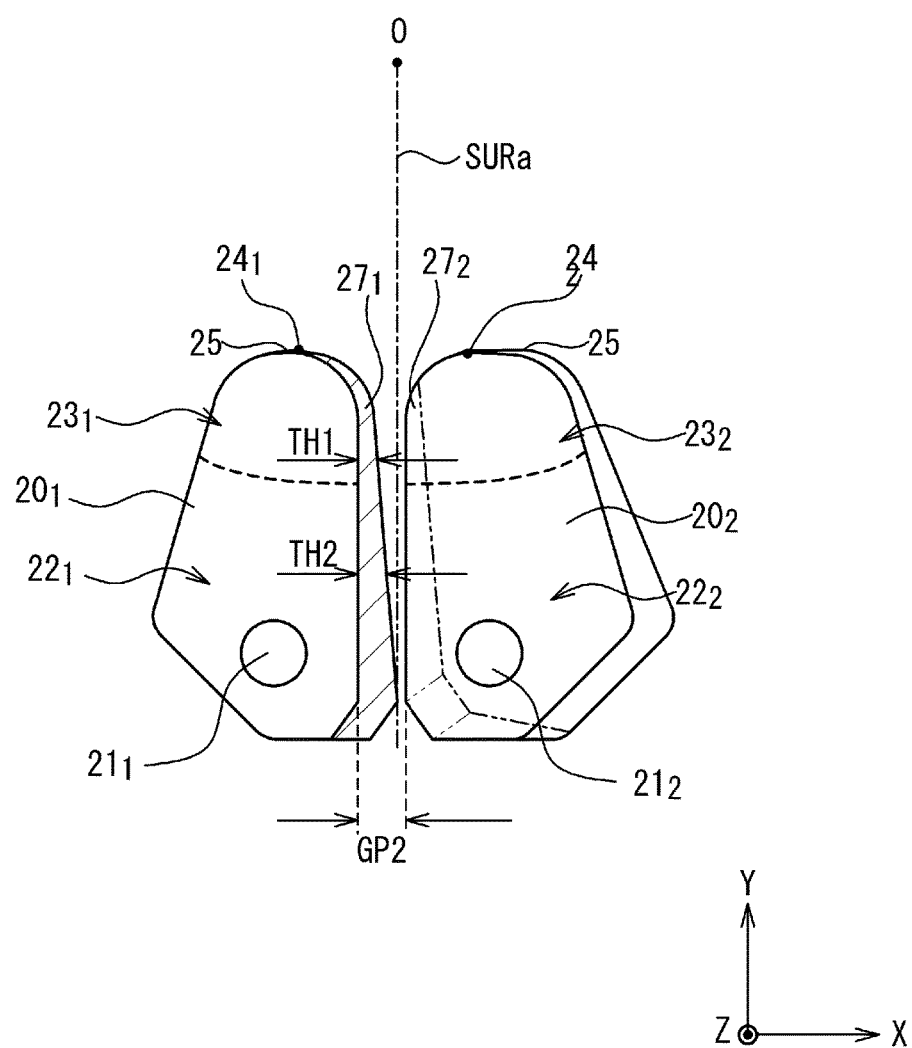
FIG. 11 is a diagram showing an outer appearance of the first tab set in a work position.

To restrain the leakage of the combustion gas from the high-pressure region REG, each of the jet tabs 20 has the following shape. FIG. 11 is a diagram showing an outer appearance of the first tab set $TAB_1$ in the work position. As shown in FIG. 11, the first jet tab $20_1$ has a first side surface $27_1$. The second jet tab $20_2$ has a second side surface $27_2$. The first side surface $27_1$ has a flat surface from the first tip section $23_1$ to the first proximal section $22_1$. When the first tab set $TAB_1$ is in the work position, the first side surface $27_1$ is parallel to the first symmetry plane SURa. In the same way, the second side surface $27_2$ has a flat surface from the second tip section $23_2$ to the second proximal section $22_2$. When the first tab set $TAB_1$ is in the work position, the second side surface $27_2$ is parallel to the first symmetry plane SURa. Therefore, when the first tab set $TAB_1$ is in the work position, the first side surface $27_1$ and the second side surface $27_2$ are parallel to each other in the flat surfaces.

At this time, a gap (a margin) GP2 exists between the first side surface $27_1$ the second side surface $27_2$. The gap GP2 has a function of preventing the first side surface $27_1$ and the second side surface $27_2$ from colliding each other when the first tab set $TAB_1$ is driven from the standby position to the work position. Note that the gap GP2 between the first side surface $27_1$ and the second side surface $27_2$ may be from 1 mm to about 5 mm. This distance is enough for prevention of collision of the first side surface $27_1$ and the second side surface $27_2$. The leakage of the combustion gas to the direction not contributing to the generation of the vectoring force, from the high-pressure region REG is sufficiently suppressed when the gap GP2 is equal to or larger than 1 mm and equal to or less than 5 mm.

As described above, it is necessary that each of the first to eighth jet tabs $20_1$ to $20_8$ has such a shape that the two jet tabs 20 neighboring in the circumferential direction do not contact regardless of the positions. Moreover, it is necessary that each of the first to eighth jet tabs $20_1$ to $20_8$ has such a shape that the jet tab does not contact the jet tab 20 opposing with respect to the central axis O.

For this purpose, the shape of each jet tab 20 of each of the jet tab sets $TAB_1$ to $TAB_4$ is set so that each of the first to fourth tab sets $TAB_1$ to $TAB_4$ does not interferes with any other jet tab set TAB, even if all of the first to fourth jet tab sets $TAB_1$ to $TAB_4$ are driven at the same time.

There are the first to fourth planes $SUR_1$ to $SUR_4$ between two of the first to fourth tab sets $TAB_1$ to $TAB_4$. The first plane $SUR_1$ is a plane between the first tab set $TAB_1$ and the second tab set $TAB_2$. In the same way, the fourth plane $SUR_4$ is a plane between the first tab set $TAB_1$ and the fourth tab set $TAB_4$. When the first tab set $TAB_1$ is driven from the standby position to the work position (or oppositely), the loci of the first tip section $24_1$ and the second tip section $24_2$ (referring to the broken line in FIG. 10) must exist inside the first plane $SUR_1$ and fourth plane $SUR_4$.

The first tip section $23_1$ has a shape becoming thinner toward the tip (the first tip section $24_1$). In the same way, the second tip section $23_2$ has a shape becoming thinner toward the tip (the second tip section $24_2$). Thus, when the first tab set $TAB_1$ is driven from the standby position to the work position, the locus of the first tip section $24_1$ (referring to the broken line in FIG. 10) falls in a region between the first symmetry plane SURa and the fourth plane $SUR_4$. The locus of the second tip section $24_2$ falls within a region between the first symmetry plane SURa and the first plane $SUR_1$. Moreover, the plane center $28_1$ of the first tip section $23_1$ approaches the side of the first proximal section $22_1$, and the plane center $28_2$ of the second tip section $23_2$ approaches the side of the second proximal section $22_2$. As a result, the span L2 (see FIG. 4) becomes short so that the bending moment M decreases.

In the first jet tab $20_1$, the thickness $TH_1$ of the first tip section $23_1$ is thinner than the thickness $TH_2$ of the first proximal section $22_1$. In the same way, in the second jet tab $20_2$, the thickness $TH_1$ of the second tip section $23_2$ is thinner than the thickness $TH_2$ of the second proximal section $22_2$. Specifically, the thickness of the first jet tab $20_1$ becomes thinner gradually to the first tip section $23_1$ from the first proximal section $22_1$. The thickness of the second jet tab $20_2$ becomes thinner gradually to the second tip section $23_2$ from the second proximal section $22_2$. Thus, the advantage can be acquired that the jet tab can endure the force F2 (referring to FIG. 4) pressed by the combustion gas in the necessary and minimum thickness.

(Other Shape of Jet Tab)

Figure 12:
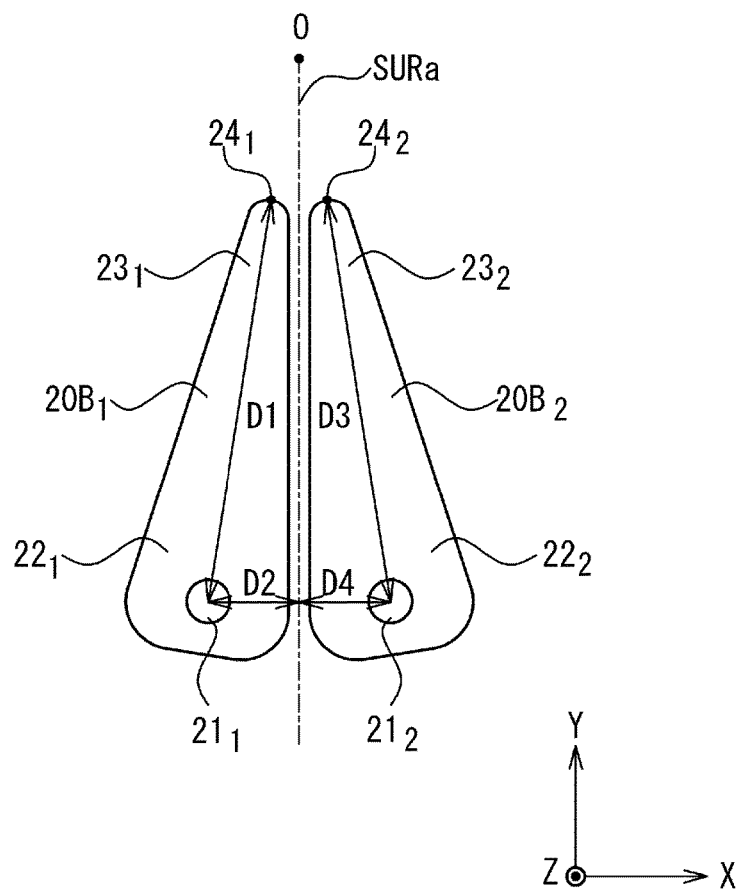
FIG. 12 is a diagram showing another outer appearance of a jet tab.

The jet tab having the following shape may be used from the above-mentioned signification. FIG. 12 is a diagram showing an outer appearance of the other shape of the jet tab 20. As shown in FIG. 12, the first jet tab $20B_1$ has a shape becoming thinner gradually toward the first tip section $23_1$ from the first proximal section $22_1$. In the same way, the second jet tab $20B_2$ has a shape becoming thinner gradually toward the second tip section $23_2$ from the second proximal section $22_2$. In this example, the distance D1 between the first tip section $24_1$ and the first rotation axis $21_1$ is larger than the distance D2 between the first rotation axis $21_1$ and the first symmetry plane SURa. Moreover, the distance D3 between the second tip section $24_2$ and the second rotation axis $21_2$ is larger than the distance D4 between the second rotation axis $21_2$ and the first symmetry plane SURa. Theoretically, it is not required that the shapes of the jet tabs used in the thrust vectoring apparatus 1 are always identical. However, in the practical viewpoint, it is desirable that the shapes of the first to eighth jet tabs $20_1$ to $20_8$ are completely same.

(Driving System)

Figure 13:
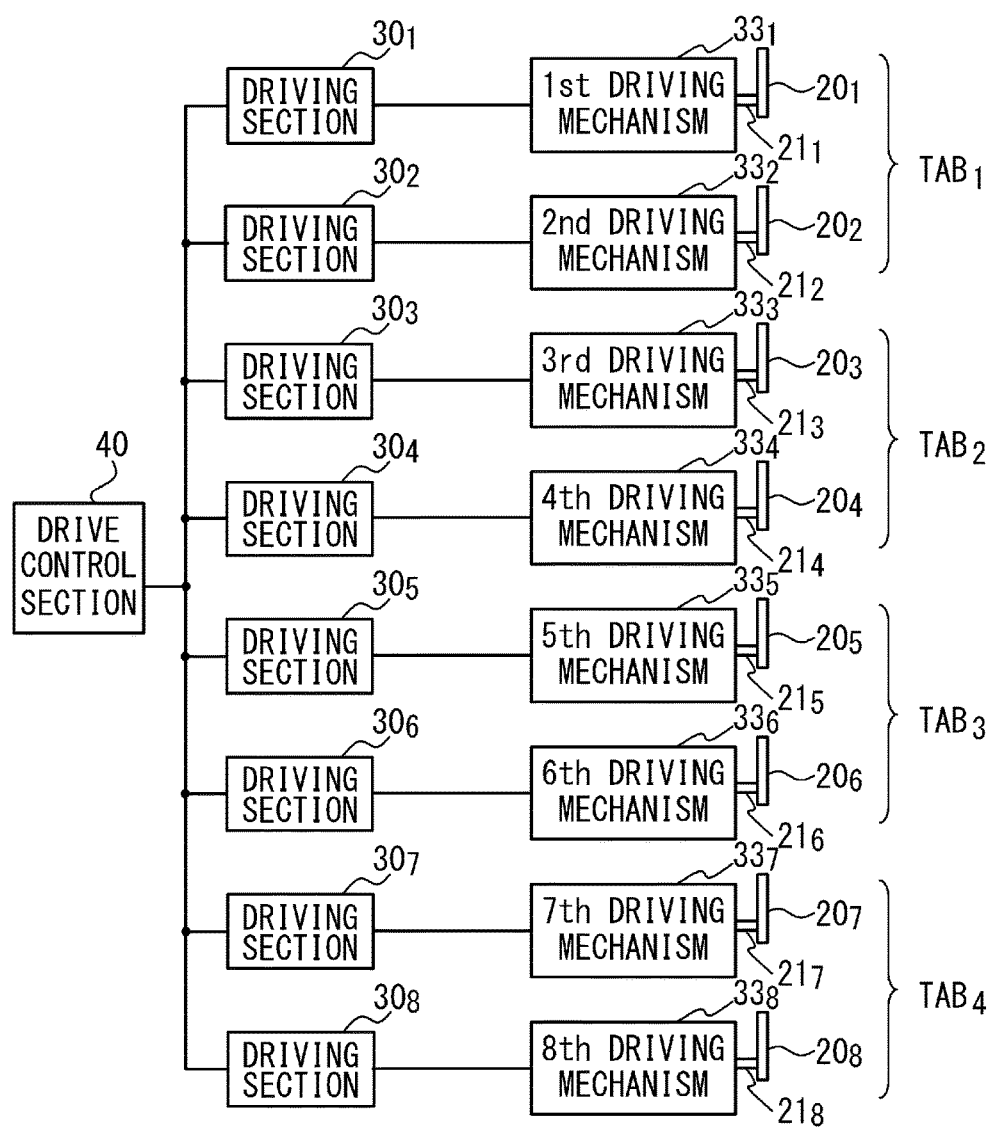
FIG. 13 is a block diagram showing a drive system of the thrust vectoring apparatus.

The drive system of the thrust vectoring apparatus 1 will be described. FIG. 13 is a block diagram showing the driving system of the thrust vectoring apparatus 1. The thrust vectoring apparatus 1 includes first to eighth driving sections $30_1$ to $30_8$, first to eighth driving mechanisms $33_1$ to $33_8$ and a drive control section 40.

Each of the first to eighth driving sections $30_1$ to $30_8$ includes a motor as an actuator. The first to eighth driving sections $30_1$ to $30_8$ are connected respectively to the first to eighth driving mechanisms $33_1$ to $33_8$. The first to eighth driving sections $30_1$ to $30_8$ generate driving forces (rotation forces) under the control of the drive control section 40. The driving section 30 of the first to eighth driving sections $30_1$ to $30_8$ which is controlled by the drive control section 40 gives the generated driving force to a corresponding driving mechanism 33.

The first driving mechanism $33_1$ is configured to rotate the first jet tab $20_1$ around the first rotation axis $21_1$. The second driving mechanism $33_2$ is configured to rotate the second jet tab $20_2$ around the second rotation axis $21_2$. The third driving mechanism $33_3$ is configured to rotate the third jet tab $20_3$ around the third rotation axis $21_3$. The fourth driving mechanism $33_4$ is configured to rotate the fourth jet tab $20_4$ around the fourth rotation axis $21_4$. The fifth driving mechanism $33_5$ is configured to rotate the fifth jet tab $20_5$ around the fifth rotation axis $21_5$. The sixth driving mechanism $33_6$ is configured to rotate the sixth jet tab $20_6$ around the sixth rotation axis $21_6$. The seventh driving mechanism $33_7$ is configured to rotate the seventh jet tab $20_7$ around the seventh rotation axis $21_7$. The eighth driving mechanism $33_8$ is configured to rotate the eighth jet tab $20_8$ around the eighth rotation axis $21_1$.

The drive control section 40 totally controls the whole driving system. The drive control unit 40 includes a microprocessor, a memory and various electronic circuits. The drive control section 40 is electrically connected with the first to eighth driving sections $30_1$ to $30_8$. The drive control section 40 drives at least one driving section corresponding to the jet tab set TAB as a drive object, of the first to eighth driving sections $30_1$ to $30_8$. For example, when the tab set TAB to be driven to acquire the desired vectoring force is the first tab set $TAB_1$, the drive control section 40 executes the following control. That is, the drive control section 40 controls the first driving section $30_1$ and the second driving section $30_2$ synchronously to move the first jet tab $20_1$ and the second jet tab $20_2$ symmetrically with respect to the first symmetry plane SURa.

(Power Dividing Mechanism (Modification of Driving System))

In the above-mentioned example, one driving section is provided for one jet tab 20. It is desirable that the numbers of driving sections is less from the viewpoint of the downsizing and lightening of the thrust vectoring apparatus. Accordingly, an example that one driving section is provided for two jet tabs 20 will be described below.

Figure 14:
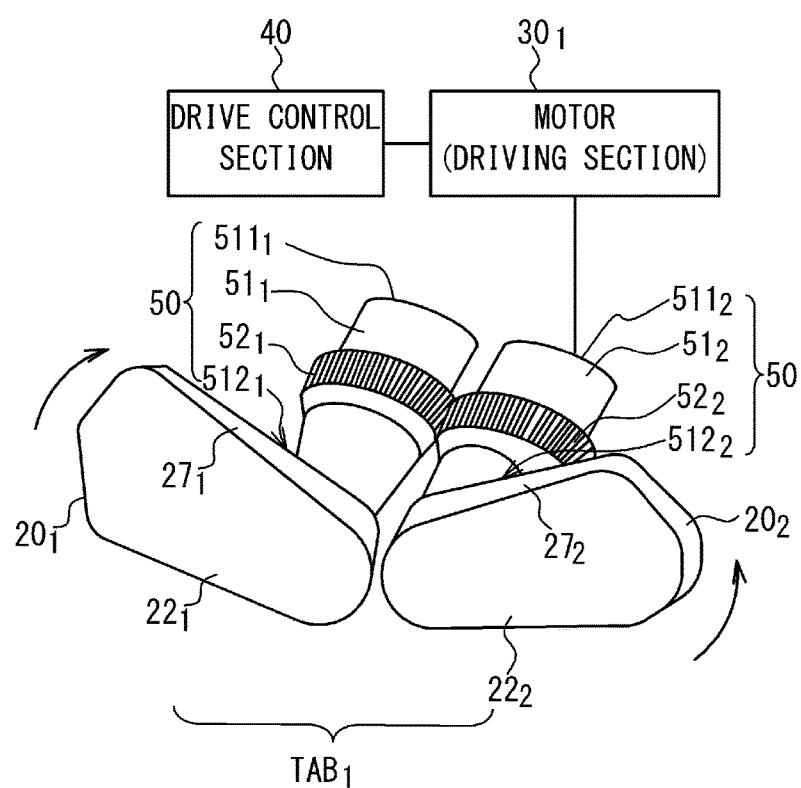
FIG. 14 is a diagram showing a power dividing mechanism 50 corresponding to the first tab set.

FIG. 14 is a diagram showing an outer appearance of a power dividing mechanism 50. FIG. 14 is a diagram showing the power dividing mechanism 50 corresponding to the first tab set $TAB_1$. Actually, the one power dividing mechanism 50 is provided for one tab set of TAB. In other words, the thrust vectoring apparatus 1 includes the power dividing mechanism 50 to each of the first to fourth tab sets $TAB_1$ to $TAB_4$.

The power dividing mechanism 50 is a mechanism of transferring the driving force of the driving section 30 to the first jet tab $20_1$ and the second jet tab $20_2$ at the same time. The power dividing mechanism 50 includes a first shaft $51_k$, a first gear $52_k$, a second shaft $51_2$ and a second gear $52_2$. The proximal section $511_1$ of the first shaft $51_1$ is released. The tip section $512_1$ of the first shaft $51_1$ is connected to the first jet tab $20_1$. Note that the first shaft $51_1$ and the first jet tab $20_1$ may be formed as a unitary body. The first gear $52_1$ is disposed on the first shaft $51_1$. The proximal section $511_2$ of the second shaft $51_2$ is connected to the first driving section $30_1$. The tip section $512_2$ of the second shaft $51_2$ is connected to the second jet tab $20_2$. Note that the second shaft $51_2$ and the second jet tab $20_2$ may be formed as a unitary body. The second gear $52_2$ is disposed on the second shaft $51_2$. In this case, the first gear $52_1$ is disposed to engage with the second gear $52_2$. Here, the first gear $52_1$ engages with the second gear $52_2$ so that the rotation direction of the first gear $52_1$ opposite to the rotation direction of the second gear $52_2$.

The operation of the power dividing mechanism 50 is as follows. Here, a case where the first tab set $TAB_1$ is driven from the standby position to the work position will be described. First, the drive control section 40 sends a control signal to the first driving section $30_1$. For example, the control signal is an electric signal with a high level. The control signal is sent to the first driving section $30_1$ until the first tab set $TAB_1$ is driven to the work position. When receiving the control signal from the drive control section 40, the first driving section $30_1$ rotates the second shaft $51_2$. The rotation direction is a direction of the Y axis (positive) from the X axis (positive). The rotation of the second shaft $51_2$ is carried out for a period during which the control signal is received. When the second shaft $51_2$ rotates, the second gear $52_2$ rotates in a same rotation direction as the rotation direction of the second shaft $51_2$. Then, the rotation of the second gear $52_2$ is transferred to the first gear $52_1$. In this case, the rotation direction of the first gear $52_1$ is a direction opposite to the rotation direction of the second gear $52_2$. When the first gear $52_1$ rotates, the first shaft $51_1$ synchronously rotates in a direction opposite to the rotation direction of the second shaft $51_2$.

One driving section is disposed for the two jet tabs 20. Therefore, the number of driving sections is decreased to a half, comparing the structure shown in FIG. 13 with the structure shown in FIG. 14. This is useful for downsizing and lighting of the thrust vectoring apparatus 1.

As described above, the downsizing of the driving section and downsizing of the jet tab becomes possible, according to the first embodiment. This leads the downsizing and lightening of the thrust vectoring apparatus.

Second Embodiment

In the first embodiment, eight jet tabs $20_1$ to $20_8$ are used. However, the jet tabs 20 more than eight may be used in a second embodiment.

Figure 15:
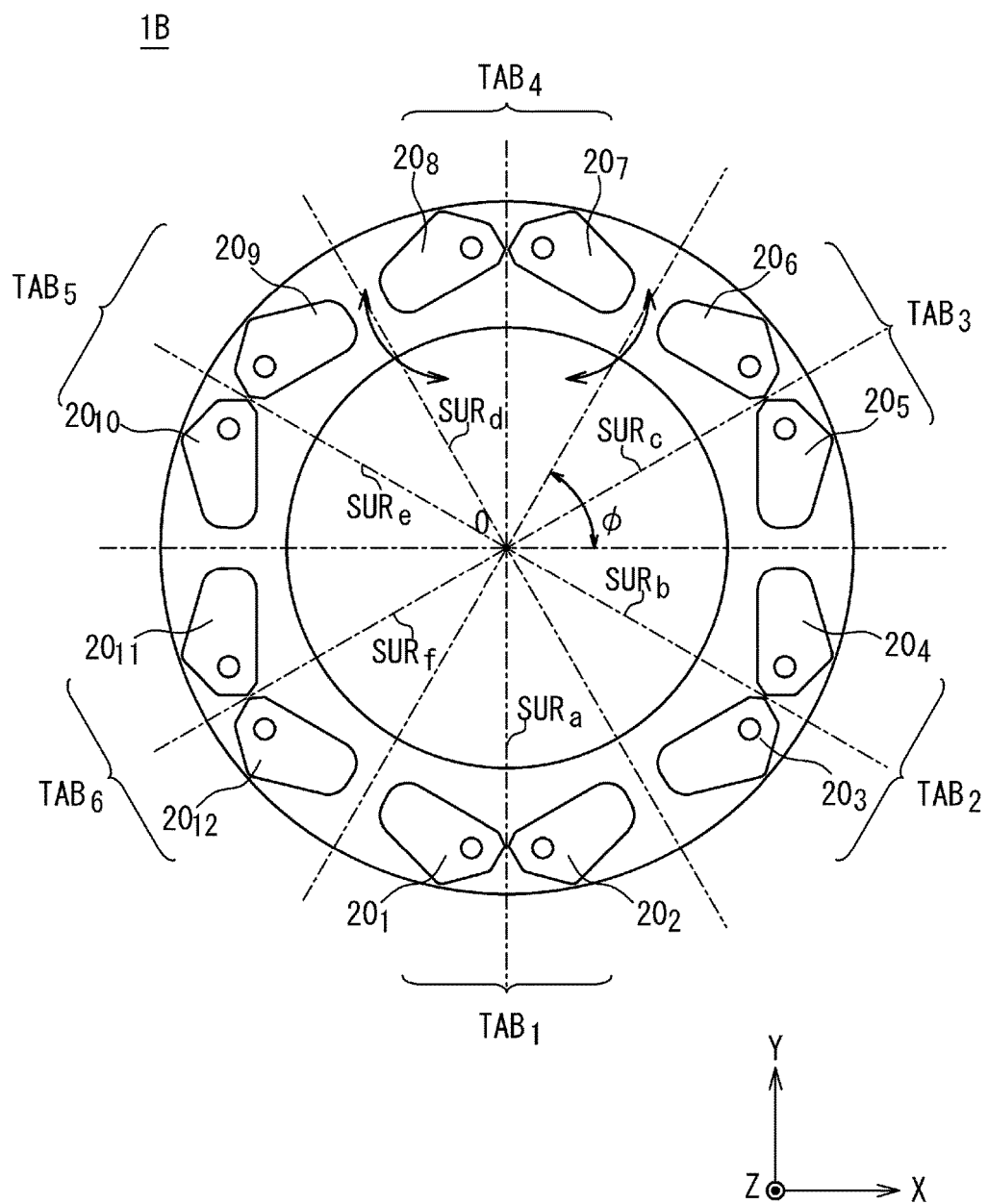
FIG. 15 is a diagram showing the thrust vectoring apparatus 1B according to a second embodiment in the rear view.

FIG. 15 is a diagram showing the thrust vectoring apparatus 1B according to the second embodiment in the rear view. In the present embodiment, 12 jet tabs $20_1$ to $20_{12}$ are disposed. In other words, there are six tabs sets $TAB_1$ to $TAB_6$. There are the first to sixth symmetry planes SURa to SURf which are provided between two jet tabs 20 of each tab set TAB.

Below, a difference from the first embodiment will be described. A fifth tab set $TAB_5$ includes a ninth jet tab $20_9$ and a tenth jet tab $20_{10}$. A sixth tab set $TAB_6$ includes an eleventh jet tab $20_{11}$ and a twelfth jet tab $20_{12}$.

The first to sixth tab sets $TAB_1$ to $TAB_6$ are arranged at the interval of $\phi=60°$ in the circumferential direction. Even in the present embodiment, the arrangement of the jet tabs 20 of each of the jet tab sets $TAB_1$ to $TAB_6$ is determined so that the first to sixth tab sets $TAB_1$ to $TAB_6$ do not interferes with each other.

Even if the number of jet tabs 20 increases like the present embodiment, the same effect as described in the first embodiment is attained.

Third Embodiment

Figure 16:
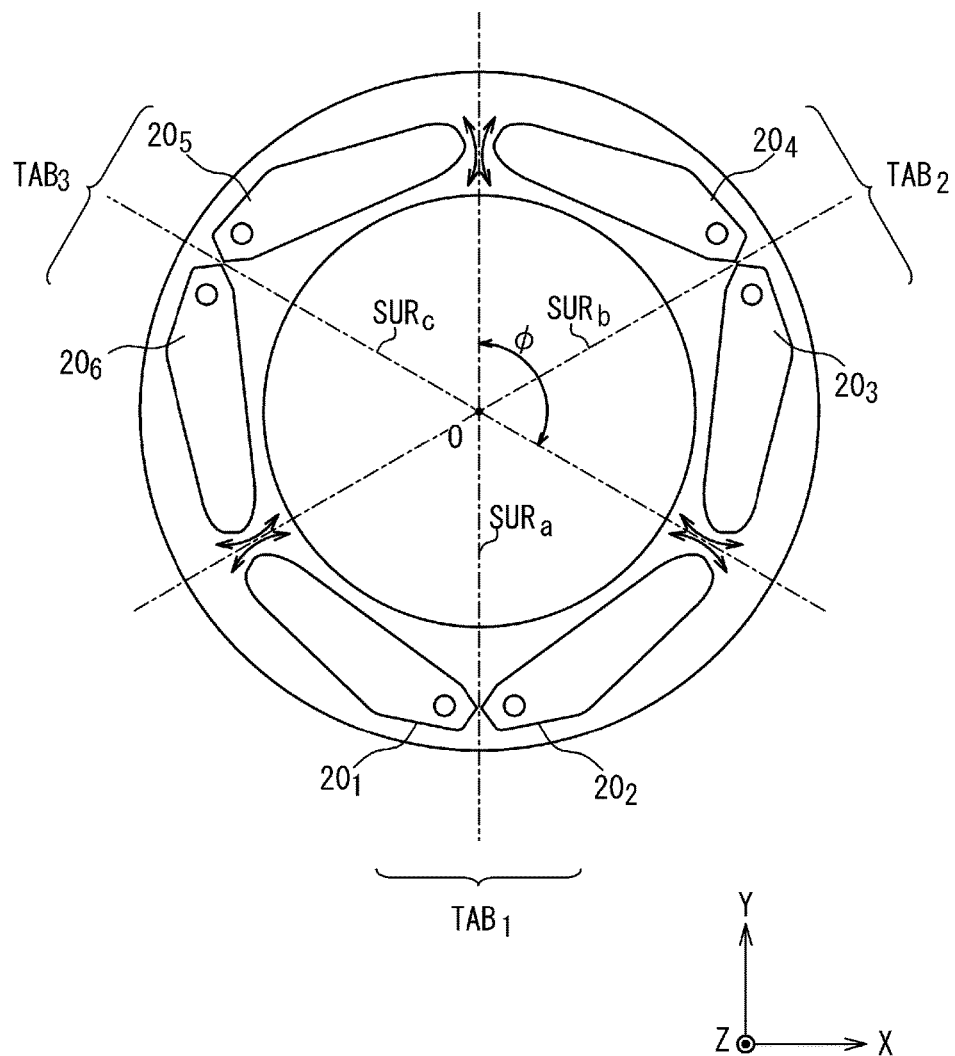
FIG. 16 is a diagram showing the thrust vectoring apparatus 1C according to a third embodiment in the rear view.

In a third embodiment, a case where the number of jet tabs 20 is less than eight will be described. FIG. 16 is a diagram showing the thrust vectoring apparatus 1C according to the third embodiment in the rear view. In the present embodiment, six jet tabs $20_1$ to $20_6$ are disposed. In other words, there are three tabs sets $TAB_1$ to $TAB_3$. The first to third symmetry planes SURa to SURc are present between two jet tabs 20 of each tab set TAB.

The first to third tab sets $TAB_1$ to $TAB_3$ are arranged at the interval of $\phi=120°$ in the circumferential direction. Even in the present embodiment, the arrangement of the jet tabs 20 in each of the tab sets $TAB_1$ to $TAB_3$ is determined so that the first to third tab sets $TAB_1$ to $TAB_3$ do not interfere with each other.

Even if the number of jet tabs 20 decreases like the present embodiment, the same effect as described in the first embodiment is obtained.

Modification Example 1

To reduce the number of driving sections, one tab set TAB may be configured from equal to or more than two jet tabs 20. Note that the number of jet tabs 20 is even numbered (e.g. four). In this case, one driving section drives all the jet tabs 20. This becomes possible by devising the power dividing mechanism 50. For example, a configuration that a plurality of gears are disposed and the plurality of gears are suitably combined is thought of. However, when the number of jet tabs 20 of one tab set TAB increases, the mechanism of the driving system becomes complicated.

Modification Example 2

To reduce the number of driving sections, a plurality of tab sets TABs (e.g. two) may be driven by one driving section. In this case, it becomes possible by devising the power dividing mechanism 50 like the modification example 1. However, when the number of tab sets TABs which are driven by one driving section increases, a mechanism of the driving system becomes complicated.

Fourth Embodiment

Figure 17:
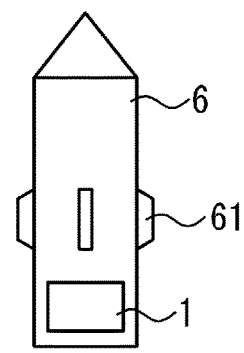
FIG. 17 is a diagram showing an outer appearance of a flying object according to a fourth embodiment.

The thrust vectoring apparatus 1 according to the first embodiment is suitable for a flying object exemplified by a missile. FIG. 17 is a diagram showing the outer appearance of the flying object 6 according to a fourth embodiment. The flying object 6 includes the thrust vectoring apparatus 1 according to the first embodiment and a plurality of steering wing 61. Because the flying object 6 includes the thrust vectoring apparatus 1, it is useful to downsize and to lighten the flying object 6. Of course, the thrust vectoring apparatus 1B according to the second or third embodiment instead of the thrust vectoring apparatus 1, 1 C may be used.

As such, the above embodiments, examples and modifications may be combined optionally in a range of no technical contradiction. Various modifications are carried out in a range where the features of the present invention are not changed.

What is claimed is:

1. A thrust vectoring apparatus comprising:
a nozzle having an opening of a nozzle exit from which a combustion gas is to be exhausted;
a plurality of tab sets, each of which comprises a first tab and a second tab, which are disposed outside the opening of said nozzle exit so as not to cover any part of the opening of said nozzle exit in a standby state;
for each of the plurality of tab sets, a single drive actuator configured to drive said first tab and said second tab from the standby state to a work state such that a direction of thrust by the combustion gas is vectored by covering a part of the opening of said nozzle exit by a tip section of said first tab and a tip section of said second tab; and
for each of the plurality of tab sets, a power dividing mechanism configured to transfer a power of said single drive actuator to said first tab and said second tab,
wherein said first tab is configured rotate around a first rotation axis and said second tab is configured to rotate around a second rotation axis,
wherein said first tab and said second tab are adjacent to each other such that no other tab is between said first tab and said second tab,
wherein said first tab and said second tab are disposed in symmetry with respect to a symmetrical plane between said first tab and said second tab,
wherein, in the work state, a distance between said tip section of said first tab and the first rotation axis is larger than a distance between the first rotation axis and the symmetrical plane and a distance between said tip section of said second tab and the second rotation axis is larger than a distance between the second rotation axis and the symmetrical plane,
wherein said first tab includes a first inner surface, said second tab includes a second inner surface, and said first inner surface and said second inner surface are parallel to each other and face each other when said first tab and said second tab are fully extended,
wherein said power dividing mechanism comprises:
rotation shafts connected to said first tab and said second tab, respectively; and
gears disposed on said rotation shafts, respectively,
wherein, when said single drive actuator is driven, said gears are engaged one after another such that said first tab and said second tab are driven from the standby state to the work state, and
wherein said gears are configured to rotate said first tab and said second tab toward each other.

2. The thrust vectoring apparatus according to claim 1, further comprising:
a microprocessor; and
a non-transitory memory having stored thereon executable instructions, which when executed by the microprocessor, cause said thrust vectoring apparatus to function as a drive control section configured to issue a control signal to said single drive actuator,
wherein said single drive actuator drives said first tab and said second tab from the standby state to the work state in response to the control signal such that said tip section of said first tab and said tip section of said second tab cover the part of the opening of said nozzle exit.

3. The thrust vectoring apparatus according to claim 2, wherein said single drive actuator drives said first tab and said second tab in symmetry with respect to the symmetrical plane.

4. The thrust vectoring apparatus according to claim 1, wherein each of said first tab and said second tab has a proximal section, and a thickness of each of said first tab and said second tab becomes thinner toward said tip section from said proximal section.

5. The thrust vectoring apparatus according to claim 1, wherein said plurality of tab sets is arranged so that said plurality of tab sets do not interfere with each other even if said plurality of tab sets is driven at a same time.

6. A flying object comprising:
a nozzle having an opening of a nozzle exit from which a combustion gas is to be exhausted;
a plurality of tab sets, each of which comprises a first tab and a second tab, which are disposed outside the opening of said nozzle exit so as not to cover any part of the opening of said nozzle exit in a standby state;
for each of the plurality of tab sets, a single drive actuator configured to drive said first tab and said second tab from the standby state to a work state such that a direction of thrust by the combustion gas is vectored by covering a part of the opening of said nozzle exit opening by a tip section of said first tab and a tip section of said second tab; and for each of the plurality of tab sets, a power dividing mechanism configured to transfer a power of said single drive actuator to said first tab and said second tab, wherein said first tab is configured rotate around a first rotation axis and said second tab is configured to rotate around a second rotation axis, wherein said first tab and said second tab are adjacent to each other such that no other tab is between said first tab and said second tab, wherein said first tab and said second tab are disposed in symmetry with respect to a symmetrical plane between said first tab and said second tab, wherein, in the work state, a distance between said tip section of said first tab and the first rotation axis is larger than a distance between the first rotation axis and the symmetrical plane and a distance between said tip section of said second tab and the second rotation axis is larger than a distance between the second rotation axis and the symmetrical plane, wherein said first tab includes a first inner surface, said second tab includes a second inner surface, and said first inner surface and said second inner surface are parallel to each other and face each other when said first tab and said second tab are fully extended, wherein said power dividing mechanism comprises:

rotation shafts connected to said first tab and said second tab, respectively; and gears disposed on said rotations shafts, respectively, wherein, when said single drive actuator is driven, said gears are engaged one after another such that said first tab and said second tab are driven from the standby state to the work state, and wherein said gears are configured to rotate said first tab and said second tab toward each other.

7. The flying object according to claim 6, further comprising:

a microprocessor; and a non-transitory memory having stored thereon executable instructions, which when executed by the microprocessor, cause said flying object to function as a drive control section configured to issue a control signal to said single drive actuator, wherein said single drive actuator drives said first tab and said second tab from the standby state to the work state in response to the control signal such that said tip section of said first tab and said tip section of said second tab cover the part of the opening of said nozzle exit.

8. The flying object according to claim 6, wherein said single drive actuator drives said first tab and said second tab in symmetry with respect to the symmetrical plane.

9. The flying object according to claim 6, wherein each of said first tab and said second tab has a proximal section, and a thickness of each of said first tab and said second tab becomes thinner toward said tip section from said proximal section.

10. The flying object according to claim 6, wherein said plurality of tab sets is arranged so that said plurality of tab sets do not interfere with each other even if said plurality of tab sets is driven at a same time.

11. A thrust vectoring method comprising:

disposing a plurality of tab sets outside an opening of a nozzle exit so as not to cover any part of the opening of said nozzle exit in a standby state, wherein each of said plurality of tab sets comprises a first tab and a second tab;

for at least one of the plurality of tab sets, driving said first tab and said second tab from the standby state to a work state with a single drive actuator and a power dividing mechanism so as to cover a part of the opening of said nozzle exit by a tip section of said first tab and a tip section of said second tab; and vectoring a direction of thrust by a combustion gas in a nozzle by said first tab and said second tab, wherein said first tab is configured rotate around a first rotation axis and said second tab is configured to rotate around a second rotation axis, wherein said first tab and said second tab are adjacent to each other such that no other tab is between said first tab and said second tab, wherein said first tab and said second tab are disposed in symmetry with respect to a symmetrical plane between said first tab and said second tab, wherein, in the work state, a distance between said tip section of said first tab and the first rotation axis is larger than a distance between the first rotation axis and the symmetrical plane and a distance between said tip section of said second tab and the second rotation axis is larger than a distance between the second rotation axis and the symmetrical plane, wherein said first tab includes a first inner surface, said second tab includes a second inner surface, and said first inner surface and said second inner surface are parallel to each other and face each other when said first tab and said second tab are fully extended, wherein said power dividing mechanism comprises:

rotation shafts connected to said first tab and said second tab, respectively; and gears disposed on said rotation shafts, respectively, wherein, when said single drive actuator is driven, said gears are engaged one after another such that said first tab and said second tab are driven from the standby state to the work state, and wherein said gears are configured to rotate said first tab and said second tab toward each other.

* * * * *